Nov. 29, 1966     L. W. PIESTER     3,288,868

OXYCHLORINATION PROCESS

Filed Nov. 5, 1963

INVENTOR.
LOYD W. PIESTER
BY
Oscar L. Spencer
ATTORNEY

United States Patent Office 3,288,868
Patented Nov. 29, 1966

3,288,868
OXYCHLORINATION PROCESS
Loyd W. Piester, New Martinsville, W. Va., assignor to Pittsburgh Plate Glass Company, Pittsburgh, Pa., a corporation of Pennsylvania
Filed Nov. 5, 1963, Ser. No. 321,581
9 Claims. (Cl. 260—654)

The present invention relates to the oxychlorination of hydrocarbons and/or chlorohydrocarbons. More particularly, the present invention relates to a process and apparatus suitable for use in the oxidative chlorination of hydrocarbons and/or chlorohydrocarbons to produce chlorinated hydrocarbon derivatives of the hydrocarbon or chlorohydrocarbon feed.

Many methods have been proposed in prior art for producing chlorinated hydrocarbons from chlorohydrocarbons and/or hydrocarbons in processes involving modified Deacon type chlorination procedure. In processes of this character, oxygen, the hydrocarbon and/or chlorohydrocarbon to be chlorinated, and chlorine or HCl as the chlorinating agent, are brought into contact at elevated temperatures with a metal halide catalyst, usually a copper chloride containing catalyst. Where HCl is utilized as the feed material, it is believed that a preliminary oxidation of the HCl takes place resulting in the formation of water and elemental chlorine. The chlorine produced then reacts with the hydrocarbon and/or chlorohydocarbon feed to produce further quantities of HCl and a chlorinated derivative of the feed material. When chlorine is utilized as the chlorinating agent, it is believed that an initial chlorination of the hydrocarbon and/or chlorohydrocarbon takes place which generates HCl. The HCl thus generated is converted by the conventional Deacon reaction to chlorine and water.

In recent years considerable emphasis has been layed on fluid bed processes for conducting such oxychlorination procedures since the reactions involved are highly exothermic and the removal of heat usually becomes a problem of considerable moment. In conducting fluidized bed processing of oxychlorination procedures of this type, however, many difficulties are encountered. Thus, many methods have been devised for providing adequate cooling of the fluidized bed catalyst particles employed during reaction. Various carriers must be tested to determine the best materials from the standpoint of thermal conductivity, lack of attrition during fluidization, and other similar considerations in order to arrive at a material suitable for use as a support for the catalyst material employed during the chlorination reaction. Product recovery from the reaction zones without injurying the catalyst particles is also another problem encountered in this area. Many of the gas mixtures fed are highly explosive under certain conditions so that proper mixing of them is an extremely important factor. In addition, corrosion of materials of construction utilized in forming the reactors involved, and the selection of the proper size of the reactors for the purpose of providing maximum productivity is also a problem. It has also been found in conducting these processes in large reactors (2 feet or more in diameter), that a considerable sacrifice in overall efficiency of the process contemplated is experienced.

The term "fluidized bed" as utilized herein in the specification and claims refers to processes in which a gas is passed through a bed of solid material wherein several different conditions may be established depending upon the gas velocity, size of the particles, etc. Thus, if gas velocities are too low, the bed of solids remains practically static; the gas simply passes through the bed pores and nothing happens to the particles contained within the bed. On the other hand, as the gas velocity is increased at least some of the particles become dynamically suspended in the upwardly rising gas stream. As a result, the bed height expands. Such beds are termed "dynamic beds." If the gas velocity is still further increased, the particles all become suspended and the bed expands even further. Ultimately, the bed may assume a highly turbulent condition which in many ways resembles a boiling liquid.

The present process is specifically designed for conducting reactions in catalyst beds with gas velocities that provide for dynamic and fluidized beds. The exact condition requisite to establishing such bed conditions depends upon such factors as the particle size and distribution of sizes of the bed particles, the components, the gas velocity, the density of the particles and other like considerations. Wilhelm & Kwauk, "Chemical Engineering Progress," volume 44, page 201 (1948), equate the various factors necessary for fluidizing a bed and by following the principles therein discussed, the desired bed conditions may be provided for. In the preferred mode of operating the instant process, a fluidized bed rather than the dynamic bed is employed.

In accordance with the present invention, a method and apparatus has been provided which minimizes many of the problems encountered in a process of the type contemplated herein. Thus, a reaction system is provided which will enable an oxychlorination procedure to proceed on a comercial basis without any undue sacrifice in the overall productivity of the procedure as it was conducted in small scale apparatus. In addition, many of the problems encountered in feeding and mixing materials for use in fluidized bed processing of oxychlorination reactions are also minimized.

In accordance with the present invention, a multi-tubular reaction zone is provided in which the oxychlorination reaction itself will take place. This multi-tubular reaction zone is superimposed on a large fluidized bed which is utilized as a mixing zone and a flame arresting area. Thus, in accordance with the practice of the present invention, two superimposed fluidized beds are operated. The lower fluidized bed is operated as a large single bed and serves to mix the gaseous reactants which will undergo oxychlorination in the upper fluidized bed. Any oxychlorination which takes place in the lower bed will not seriously hamper the operations of the upper fluidized bed because of the large diameter of the lower bed and consequently the large bed serves effectively as a flame arrestor. Superimposed above the fluidized bed of relatively large cross-sectional area is a compartmentalized fluidized bed having several physically distinct zones contained therein. These compartmentalized, physically distinct, catalytic fluidized bed reaction zones are utilized to conduct the major portion of the oxychlorination reaction desired. The compartmentalized, physically distinct, fluidized bed catalytic reaction zones in relationship to the large cross-sectional area fluidized bed reaction zones on which they are superimposed typically have diameters which are from ⅓ to ⅟₅₀ the diameter of the large zone upon which they are superimposed. Typically enough secondary beds are provided so that the total cross-sectional area of the secondary beds is at least ¼ the total cross-sectional area of the lower bed and preferably is equal to or up to 100 percent greater than the cross-sectional area of the lower bed.

For a more complete understanding of the present invention reference is made to the accompanying drawings in which FIGURE 1 shows a side elevation of a multi-tubular reactor with one superimposed fluidized bed being shown positioned above a bed of larger cross-sectional area;

In conducting the oxychlorination reactions contemplated in this system utilizing the method herein described the large cross-sectional area fluidized bed is utilized as a mixing zone. The depth of this zone will vary depending upon the particular gaseous feeds that are employed. In addition, the extent to which the temperature of the mixing zone is controlled will depend in part upon the particular materials that are employed. Thus, with highly explosive materials such as ethylene and oxygen, particular care should be taken to insure that the gases as they are fed into the mixing portion of the reaction zone are maintained cool enough to prevent any spontaneous explosions. In addition, the residence time of the gases in the mixing zone can be regulated so that a short residence time is provided for gas mixtures entering the mixing fluidized bed. The depth of the bed may be controlled by moving the tube sheet 8 shown in FIGURE 1 up or down in the column to lengthen or shorten the depth of the large cross-sectional fluidized bed.

Figure 2:
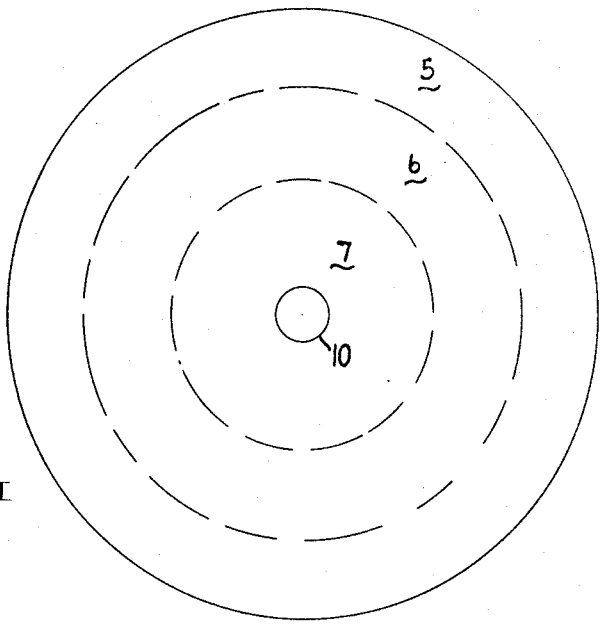
FIGURE 2 is a cross-sectional view of the bottom of the reactor of FIGURE 1 taken along line I—I of FIGURE 1.
Figure 3:
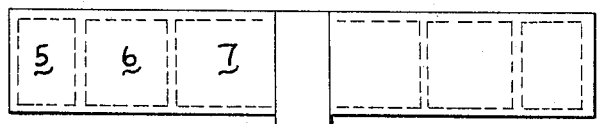
FIGURE 3 is a longitudinal section of the compartmented distributor plate of the large fluidized bed of FIGURE 1.

As an example of how the system operates in the particular embodiments shown in the drawing, chlorine, ethylene dichloride and oxygen may be fed to a fluidized bed of inert particles using the distribution system described in FIGURE 2. Thus, ethylene dichloride, chlorine and oxygen are fed to the system individually in the compartments provided in the distributor plate section of the lower fluidized bed. The lower fluidized bed itself contains particles of sand or other similar inert material and it utilized solely for the purpose of providing adequate mixing of the gaseous feeds. If fed individually, these reactants might tend to become explosive in this zone should they not be thoroughly mixed. The temperature in this zone is controlled to provide temperatures below about 500° F. preferably between 200° F. and 450° F. In the case of ethylene and oxygen mixtures this temperature should be below 250° F. This control may be achieved by the insertion of cooling coils in the fluidized bed itself, by suitably jacketing the lower reaction or by feeding the gas cold to this zone. Cooling devices of the type mentioned are conventional in the art and are therefore not shown in the drawings.

The gases upon emerging from the lower fluidized bed section enter the individual fluidized beds contained in the section of the reactor column above the lower fluidized bed where they are contacted with an oxychlorination catalyst such as a cupric chloride-potassium chloride mixture contained on a porous support material. The major portion of the oxychlorination reaction takes place inside the individual tubes and the gases are removed from the top of these small fluidized beds and passed to suitable condensing and collecting equipment. After condensation and collection, the hydrocarbon chlorides produced during the reaction are conveniently separated, such as for example, by distillation procedures.

Figure 1:
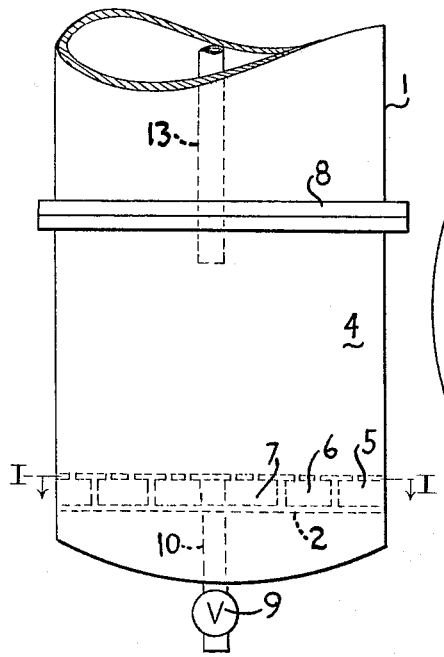

Turning to the drawing, reactant gases are fed to the fluidized bed zone 4, through the distributor system generally indicated at 2. As shown in FIGURES 1 and 2, the hydrocarbon and/or chlorohydrocarbon utilized as feed enters the lower fluidized bed chamber 4 through the distributor plate 2 which is divided into three compartments. Compartment 5 is utilized to introduce hydrocarbon and/or chlorohydrocarbon utilized as feed. Compartment 6 is utilized to feed the halogen and/or HCl utilized as the chlorinating agent and the oxygen utilized is introduced through chamber 7. The gases upon entering the lower fluidized bed 4 are intimately mixed and passed upwardly to the gas distribution section of the individual tubes 13 mounted in the tube sheet 8 and located above the lower fluidized bed. This sheet also serves as a cover plate for this section of the reactor.

Figure 4:
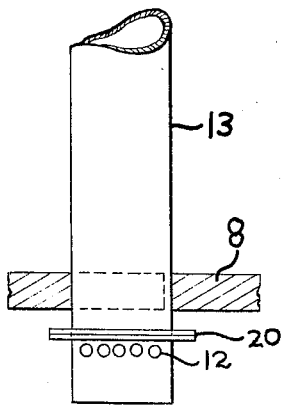
FIGURE 4 is a side view partially in section of the individual tube shown in FIGURE 1.

Located in the bottom of the gas distribution section of the lower fluidized bed is an open tube 10 provided with a suitable valve 9. This open tube 10 is utilized for the purpose of removing the inert particles from the lower fluidized bed when necesary. The gases rising vertically from the lower fluidized bed, which bed conveniently contains particles of sand or other inert material of a suitable size, for example 30 to 100 mesh, enter the upper fluidized bed located inside of tube 13 through a plurality of openings or orifices, generally indicated as 12 in FIGURES 4 and 5, and the fluidization of the bed contained within the individual tube 13 takes place. Situated a short distance from the gas openings 12 is a perforated plate distributor which serves as the base for the fluidized bed contained in the individual tube 13. While only one tube 13 is shown in the drawing, it is of course to be understood that in a commercial application a multiplicity of these tubes would be mounted in the tube sheet 8. The gases emerge from the lower portion of the individual tube 13 through the openings 15 in the distributor plate 14, and the bed of catalyst particles supported above the distributor plate inside of the tube 13 is then fluidized. Tube 13 is preferably fitted with a flange 20 which abuts against the tube sheet 8 when the tube 13 is in place. Though this is preferred for convenience, the flange member need not be employed.

Figure 5:
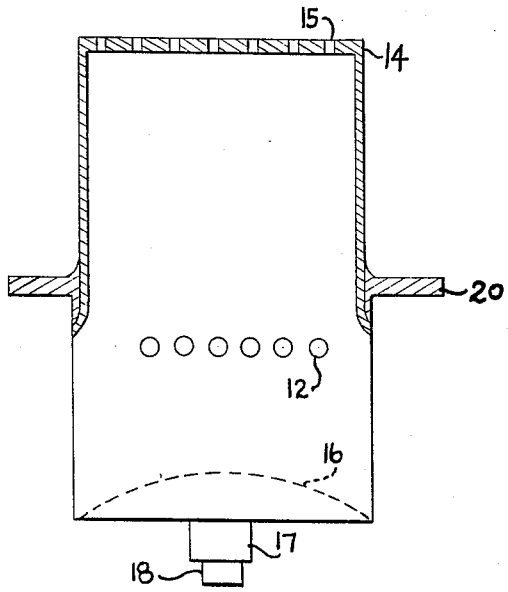
FIGURE 5 is a longitudinal section of the individual tube of FIGURE 1 showing the details of the gas distribution system.

Catalyst particles falling through the distributor plate during fluidization, that is, particles of a size smaller than the openings in the distributor plate, which particles are generally formed by natural attrition during the fluidization process, are collected in the bottom portion of the individual tube 13 as illustrated by the broken line 16 in FIGURE 5, which depicts a mound of catalyst collected in the bottom of the tube. A tube or pipe 17 is provided in the bottom of this portion of the reactor tube and is fitted with a plug 18 which can be removed to facilitate the removal of catalyst that has accumulated in this portion of the individual fluidized bed. Thus, the lower fluidized bed, where it communicates with the individual tubes superimposed upon it, is protected from contamination with catalyst from the individual tubes by a catalyst catching device. This is an extremely important consideration in the processing of materials in a fluidized bed containing oxychlorination catalyst since any catalyst contamination of the lower portion of the overall reaction zone would result in deleterious effects by causing the reaction to take place in the lower fluidized bed. It is extremely important that the gases in the lower fluidized bed mixing zone be mixed while cold or at least not be warmed to any appreciable degree during mixing. The presence of catalyst particles in the lower fluidized bed could cause the exothermic oxychlorination reactions to take place in this mixing zone with a consequent rise in temperature in this zone and thereby create a serious danger of explosion occurring in that portion of the bed.

A typical illustration of reaction taking place in accordance with the practice of this invention would involve passing ethylene, HCl and oxygen into the fluidized bed reaction system for the purpose of producing ethylene dichloride. In conducting a reaction of this type a catalyst is prepared typically by dissolving 29 lbs. of $$CuCl_2 \cdot 2H_2O$$

15.2 lbs. of KCl and 5.3 gallons of distilled water. A 10-inch internal diameter reactor is charged with 100 lbs. of 30–60 mesh U.S. Sieve Series Florex (a calcined fuller's earth manufactured by the Floridin Corporation). Florex particles are fluidized in the reactor by blowing warm air up through the 100 lb. bed of particles at a superficial linear velocity of 0.5 foot per second. The temperature of the bed is maintained at 220° F. and the catalyst containing the solution is added to the bed dropwise until the entire 5.3 gallons of solution are added. The reactor is shut down when the water of solution of the catalyst added to the bed no longer comes off the reactor as overhead. The catalyst prepared in this manner is then charged to three nickel tubes 6 inches in diameter located in a reactor vessel of the type shown in FIGURE 1 and mounted therein in a tube sheet 8. Oxygen is introduced into the reaction vessel 1 via compartment 7 of the distributor plate of the lower fluidized bed 4. HCl is introduced through compartment 6 and ethylene is introduced through compartment 5. The molar feed ratio of ethylene to HCl to oxygen during the run is maintained at 1 to 2.03 to 0.61. The three nickel tubes are temperature controlled by providing a jacket around all three tubes and circulating Dowtherm (a eutectic of diphenyl and diphenyl oxide) or other suitable heat exchange media in the upper portion of the reaction vessel 1 (the portion above the tube sheet 8) and surrounding the individual reactor tubes. The Dowtherm is vaporized, passed to a condenser located outside of the reaction vessel 1 and recirculated to the reaction vessel after condensation. The lower fluidized bed is provided with an air jacket (not shown) to maintain the temperature therein at about 250° F. The reaction gases in the molar feed ratio hereinabove referred to are fed to the lower fluidized bed which is 12 inches in diameter and 24 inches in depth. The mixed gases upon emerging from the lower fluidized bed enter the indivdual reactor tubes 13 through the openings 12 at a velocity sufficient to provide fluidization of the catalyst particles contained within the individual tubes. The upper portion of the individual tubes open into an expanded chamber where a mass of particles from the fluidized bed are maintained so that the particles emerging from the individual tubes are recirculated by deflector plates back into the upper portion of the individual reactor tubes. The temperature of individual tubes is controlled by the circulating Dowtherm to maintain it at 550° F. Upon completion of the runs, the chlorinated hydrocarbon content of the reactor gases emerging from the upper portion of the individual tube section of the fluidized beds are condensed and collected. Typical utilization of ethylene is 93.4% or better. HCl utilization typically ranges between 90 and 95% and the ethylene dichloride yields are 89 to 92 mole percent based on the ethylene fed.

The catalytic material employed in the small diameter fluidized beds is preferably a copper chloride containing oxychlorination catalyst. The preferred catalyst is a copper chloride-potassium chloride catalyst impregnated on a Florex carrier. While this catalytic material forms the preferred embodiment, it is of course to be understood that any suitable oxychlorination catalyst may be employed. Florex forms a preferred material for use as a base or support material for the impregnation of the catalytic material but other suitable support material such as Celite, which is a calcined diatomaceous earth, kieselguhr, silica gel and materials of this character may also be employed if desired.

While the invention has been described specifically with reference to the production of ethylene dichloride from ethylene and HCl and oxygen, other hydrocarbons and chlorohydrocarbons may be processed in a similar manner. Thus, methane may be fed in conjunction with chlorine and/or HCl. Oxygen or oxygen enriched air or air itself may be employed as the oxygen supplying medium. The particular proportions of materials utilized to provide a given product will depend upon the stoichiometry of the equations necessary to produce this product based on a given set of starting materials. Considerations of this character are well within the skill of the art and form no part of the invention herein disclosed.

Thus, while the invention has been described with reference to certain specific examples, it is of course to be understood that it may be varied considerably depending upon the particular product desired and the starting materials employed. The important consideration is the processing steps necessary to accomplish the sufficient mixing prior to the introduction of the gaseous starting materials to the fluidized bed oxychlorination zone and the protection of the lower fluidized bed zone from contamination by catalyst particles from the oxychlorination zone during the reaction.

Thus, it is not intended that this invention be limited except insofar as appears in the following claims.

I claim:

1. In a method of oxychlorinating aliphatic hydrocarbons and their incompletely chlorinated derivatives in a fluidized bed of oxychlorination particles by passing the material to be chlorinated, oxygen and a member of the group consisting of elemental chlorine, HCl and mixtures thereof in contact with said catalyst particles, the improvement comprising introducing the oxygen, the material to be chlorinated and a member of said group into a fluidized bed of inert particles to thereby mix the material so introduced into said bed of inert particles, introducing the mixed material into a plurality of small fluidized beds, said plurality of beds comprising particles of oxychlorination catalyst and having a total cross-sectional area at least ¼ total cross-sectional of said inert bed while controlling the temperature of said inert particles below 500° F. and operating the said plurality of beds at a temperature sufficient to cause a reaction of the mixed materials to take place therein.

2. In a method of oxychlorinating aliphatic hydrocarbons and their incompletely chlorinated derivatives in a fluidized bed of oxychlorination catalyst particles by passing the material to be chlorinated in contact with oxygen and a chlorinating agent selected from the group consisting of elemental chlorine, HCl and mixtures thereof, the improvement comprising introducing the chlorinating agent, oxygen and material to be chlorinated in the gaseous state in an inert fluidized bed operated at a temperature below about 500° F., to thereby mix said gases and subsequently introducing the mixed gases into a second fluidized bed having a diameter ⅓ to ⅟₅₀ the diameter of said inert bed, maintaining the temperature of the second fluidized bed at a temperature sufficient to cause an oxychlorination reaction to take place in the presence of oxychlorination catalyst particles contained in said smaller bed while preventing the catalyst particles from said second bed from entering said first bed.

3. The method of claim 2 wherein the material to be chlorinated is ethylene and the chlorinating agent is HCl and said inert fluidized bed is operated at a temperature below about 250° F.

4. The method of claim 2 wherein the material to be chlorinated is ethylene dichloride and the chlorinating agent is elemental chlorine.

5. The method of claim 2 wherein the material to be chlorinated is ethylene dichloride and the chlorinating agent is HCl.

6. In a method of oxychlorinating aliphatic hydrocarbons and their incompletely chlorinated derivatives in a fluidized bed of catalyst particles by passing the material to be chlorinated in contact with oxygen and a chlorinating agent selected from the group consisting of elemental chlorine, HCl and mixtures thereof, the improvement comprising introducing the chlorinating agent, oxygen and material to be chlorinated in an inert fluidized bed operated at a temperature below 500° F., to thereby mix said gases and subsequently introducing the mixed gases into a plurality of fluidized beds superimposed on said inert bed, each of said plurality of beds having a diameter ⅓ to ⅟₅₀ the diameter of said inert bed, the total cross-sectional area of said plurality of beds being at least one-fourth the total cross-sectional area of said inert bed, maintaining the temperature of the plurality of fluidized beds at a temperature sufficient to cause an oxychlorination reaction to take place therein in the presence of oxychlorination catalyst particles while preventing the catalyst particles in said plurality of beds from entering said inert bed.

7. The method of claim 6 wherein the material to be chlorinated is ethylene and the chlorinating agent is HCl and said inert fluidized bed is operated at a temperature below 250° F.

8. The method of claim 6 wherein the material to be chlorinated is ethylene dichloride and the chlorinating agent is elemental chlorine.

9. The method of claim 6 wherein the material to be chlorinated is ethylene dichloride and the chlorinating agent is HCl.

References Cited by the Examiner

UNITED STATES PATENTS

| | | | |
|---|---|---|---|
| 2,500,516 | 3/1950 | Carpenter | 23—288.3 |
| 2,654,659 | 10/1953 | Friedman | 23—288.3 |
| 2,760,917 | 8/1956 | Ward | 23—288.3 |
| 2,783,286 | 2/1957 | Reynolds | 260—659 X |
| 2,948,587 | 8/1960 | Johnson et al. | 23—288.3 |
| 2,954,281 | 9/1960 | Schott | 23—288.3 |
| 3,151,944 | 10/1964 | Stevens et al. | 23—288.3 |

FOREIGN PATENTS 1,296,982   5/1962   France.

LEON ZITVER, *Primary Examiner.*

K. V. ROCKEY, *Assistant Examiner.*